United States Patent
Cauvin et al.

(10) Patent No.: US 7,730,471 B2
(45) Date of Patent: Jun. 1, 2010

(54) METHOD AND SYSTEM FOR PROCESSING COBOL LANGUAGE RECORD DESCRIPTION ENTRIES THAT SPECIFY DATA ITEMS THAT INCLUDE A VARYING LENGTH CHARACTERISTIC AND COMPUTER READABLE STORAGE MEDIUM FOR STORING INSTRUCTIONS FOR PERFORMING THE METHOD

(75) Inventors: Kenneth L. Cauvin, Livonia, MI (US); Irene A. Ford, Plymouth, MI (US); Thomas C. Zavela, Farmington Hills, MI (US); Hiroshi Abe, West Bloomfield, MI (US); Edward J. Kriegel, Troy, MI (US)

(73) Assignee: Compuware Corporation, Detroit, MI (US)

( * ) Notice: Subject to any disclaimer, the term of this patent is extended or adjusted under 35 U.S.C. 154(b) by 1058 days.

(21) Appl. No.: 11/180,160

(22) Filed: Jul. 13, 2005

(65) Prior Publication Data

US 2007/0016569 A1    Jan. 18, 2007

(51) Int. Cl.
G06F 9/44 (2006.01)
G06F 9/45 (2006.01)
G06F 7/00 (2006.01)

(52) U.S. Cl. .................. 717/153; 717/108; 717/121; 717/151; 707/2; 707/6; 707/8; 707/101

(58) Field of Classification Search .............. None
See application file for complete search history.

(56) References Cited

U.S. PATENT DOCUMENTS

| | | | | |
|---|---|---|---|---|
| 5,604,177 A * | 2/1997 | Kinnersley et al. | ........... | 504/147 |
| 5,649,180 A * | 7/1997 | Danno et al. | .................. | 707/1 |
| 5,826,076 A * | 10/1998 | Bradley et al. | ................ | 707/4 |
| 5,838,965 A * | 11/1998 | Kavanagh et al. | ....... | 707/103 R |
| 5,857,205 A * | 1/1999 | Roth | ........................ | 707/203 |
| 5,878,422 A * | 3/1999 | Roth et al. | .................. | 707/100 |
| 5,956,510 A * | 9/1999 | Nicholas | .................... | 717/137 |
| 5,960,433 A * | 9/1999 | Fujii et al. | .................. | 707/100 |
| 6,519,601 B1 * | 2/2003 | Bosch | ....................... | 707/100 |
| 7,185,017 B1 * | 2/2007 | Cauvin et al. | ............... | 707/101 |
| 7,213,243 B2 * | 5/2007 | Kira | .......................... | 717/159 |
| 2004/0064808 A1 * | 4/2004 | Kira | .......................... | 717/154 |

* cited by examiner

*Primary Examiner*—Tuan Q Dam
*Assistant Examiner*—Isaac T Tecklu
(74) *Attorney, Agent, or Firm*—Brooks Kushman P.C.

(57) ABSTRACT

A method, system and computer readable storage medium for storing instructions for processing COBOL language record description entries that specify data items that include a varying length characteristic are provided. The method includes providing COBOL language record description entries that specify data items that include a varying length characteristic and a plurality of subfields including a length subfield. The method further includes processing the COBOL language record description entries to create at least one of a compiled specification and compiled data. The subfields are treated as a single composite field, and the length subfield is automatically set to the appropriate corresponding value during processing.

24 Claims, 4 Drawing Sheets

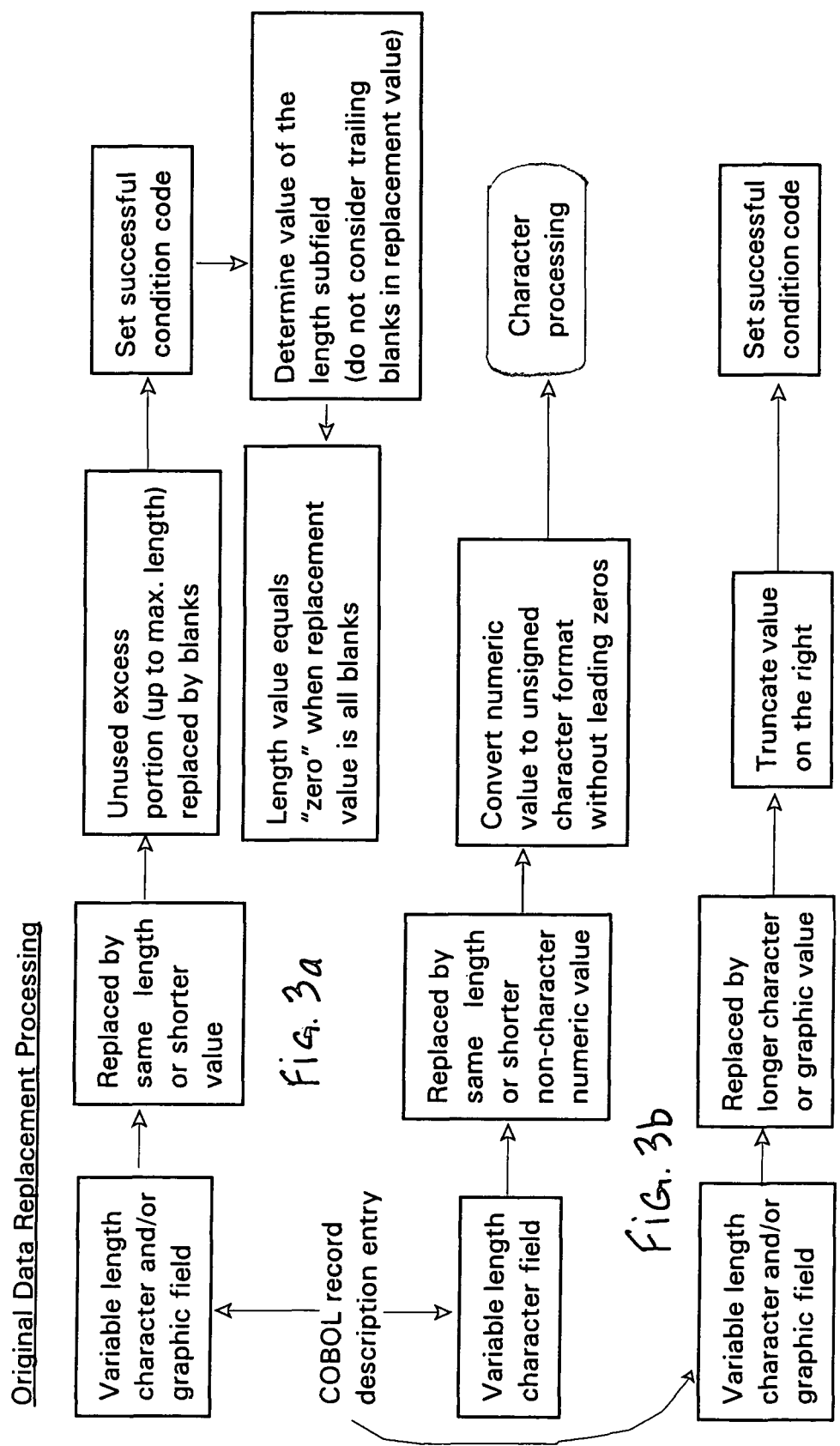

METHOD AND SYSTEM FOR PROCESSING COBOL LANGUAGE RECORD DESCRIPTION ENTRIES THAT SPECIFY DATA ITEMS THAT INCLUDE A VARYING LENGTH CHARACTERISTIC AND COMPUTER READABLE STORAGE MEDIUM FOR STORING INSTRUCTIONS FOR PERFORMING THE METHOD

BACKGROUND OF THE INVENTION

1. Field of the Invention

This invention generally relates to methods and systems for processing COBOL language record description entries that specify data items that include a varying length characteristic and computer readable storage medium for storing instructions for performing the method. In particular, one embodiment of the invention relates to VARCHAR/VARGRAPHIC/COBOL source language definition, compilation and processing support.

2. Background Art

Database languages such as DB2 have the facility to map an extract file by generating record description entries in PL/I and/or COBOL. However, fields that are defined with a varying length attribute cannot be described in the same manner in both PL/I and COBOL since COBOL does not support such an attribute.

In other words, database languages such as DB2 have allowed a varying length attribute for character and/or graphic fields. This allowed the storage space requirements for data to be reduced by storing only the actual amount of data used for a particular data item rather than always storing a fixed, maximum number of bytes that frequently contained many unused (blank) bytes. Previous solutions allowed for the extracting and/or unloading of data from databases into sequential files. Application program interfaces were also provided which allowed user written programs access to the data.

When extracted and/or unloaded varying length data items are placed into computer memory, they are frequently broken down into two (2) subfields. The first subfield contains length and is a two (2) byte binary half word that contains the number of SBCS/DBCS (i.e., Single Byte Character Set/Double Byte Character Set) characters actually used. Graphic data uses the DBCS for data content and each graphic character requires two (2) bytes of memory. For example, a field containing 9 graphic characters will have a length value of 9, even though it requires 18 bytes of memory. The second subfield contains the actual data. The amount of memory reserved is based on the specified maximum allowed number of characters regardless of the actual number of used bytes.

Some application programming languages such as PL/I have allowed for the definition of data items that include a varying length attribute. However, previous and current COBOL compilers make no provision for such an attribute. In COBOL, the above-mentioned two subfields must be defined as two separate and distinct data items. The first item defines the length as a two (2) byte binary half word. The second item defines a fixed length character and/or graphic field based on the specified maximum allowed number of characters. With COBOL, application programmers must maintain the relationship between the two independent fields by updating both fields themselves.

Data processing frequently involves retrieving stored data, processing the retrieved data, and storing or otherwise using the processed data. These functions may be embodied in a data processing application that is part of a larger data processing system. In many cases, the process is independent from the storage and retrieval system and a predefined syntax is used to communicate data between the two. Some storage and retrieval systems restrict how data is stored and retrieved. For example, a storage and retrieval system may group data into files, records, and fields, and typically access the data at the field level or higher. Similarly, the process itself may only accept and return field level data. Accordingly, the syntax for communicating the data to the process may also be limited to field level data. The lowest level data sets handled by a storage and retrieval system, process, or communication syntax may be referred to as a "data segment." In the example above, the data segments are fields.

For additional understanding of the limitations in some data processing systems, a look at how digital data is stored may be instructive. Digital data is frequently stored in one or more data sources, such as a database or data warehouse. The data may be stored according to a variety of data structures corresponding to physical memory locations. The physical data structure may, in turn, correspond to one or more storage/access structures, such as a file structure or hierarchical or relational database structure.

For example, the data may be divided into files, which are divided into records, which are divided into fields. Fields may actually include a sequence of bits (1s and 0s). Depending on the data type of the field, the sequence of bits may be translated into another format, such as integers, floating point numbers, strings, logic values, or other formats. Fields may be viewed as being composed of one or more sub-segments based upon their data type.

For example, an integer or floating point number may include one or more decimal digits, a string may include one or more characters. These individual decimal digits or characters are the field's sub-segments. Sub-segments may correspond directly to a fixed number of bits, such as characters corresponding to bytes, packed decimal digits corresponding to four bit nibbles, or Boolean or binary data corresponding to a single bit.

Other data, such as some integers, may be stored in variable bit length sub-segments. Fields may also include one or more bits corresponding to other information, such as a sign or the location of a decimal point. In some cases, this additional information may be coded into a particular sub-segment in the field. Other data processing systems may handle data using data segments other than fields that are similarly composed of sub-segments.

SUMMARY OF THE INVENTION

An object of the present invention is to provide a method and system for processing COBOL language record description entries that specify data items that include a varying length characteristic and computer readable storage medium for storing instructions for performing the method.

Another object of the present invention is to provide a method, system and computer readable storage medium for storing instructions for processing COBOL language record description entries that specify data items that include a varying length characteristic wherein varying length subfields are processed as one composite field.

Still another object of the present invention is to provide a method, system and computer readable storage medium for storing instructions for processing COBOL language record description entries that specify data items that include a varying length characteristic wherein COBOL applications programmers do not have to maintain two subfields separately themselves.

Yet still another object of the present invention is to provide a method, system and computer readable storage medium for storing instructions for processing COBOL language record description entries that specify data items that include a varying length characteristic wherein data processing installations that restrict their record description entries to the COBOL language are able to define and process varying length character and/or graphic subfields as one field within their COBOL record descriptions.

In carrying out the above objects and other objects of the present invention, a method for processing COBOL language record description entries that specify data items that include a varying length characteristic is provided. The method includes providing COBOL language record description entries that specify data items that include a varying length characteristic and a plurality of subfields including a length subfield. The method further includes processing the COBOL language record description entries to create at least one of a compiled specification and compiled data. The subfields are treated as a single composite field, and the length subfield is automatically set to the appropriate corresponding value during the step of processing.

The method may further include providing replacement data specifications, and a compiled replacement specification is created based on the replacement data specification during the step of processing.

The method may further include providing replacement data, and compiled replacement data is created during the step of processing based on the replacement data.

Both a compiled specification and compiled data may be created during the step of processing.

At least one of the compiled specification and the compiled data may be used during replacement processing.

The data item may be any type allowed by COBOL and, in addition, may be a character or graphic data item that includes a varying length characteristic.

Still further in carrying out the above objects and other objects of the present invention, a system for processing COBOL language record description entries that specify data items that include a varying length characteristic is provided. The system includes means for providing COBOL language record description entries that specify data items that include a varying length characteristic and a plurality of subfields including a length subfield. The system further includes a processor for processing the COBOL language record description entries to create at least one of a compiled specification and compiled data. The subfields are treated as a single composite field, and the length subfield is automatically set to the appropriate corresponding value during processing.

The system may further include means for providing replacement data specifications. A compiled replacement specification may be created based on the replacement data specification during processing.

The system may further include means for providing replacement data. Compiled replacement data may be created during processing based on the replacement data.

Both a compiled specification and compiled data may be created during processing.

At least one of the compiled specification and the compiled data may be used during replacement processing.

The data item may be any type allowed by COBOL and, in addition, may be a character or graphic data item that includes a varying length characteristic.

Yet still further in carrying out the above objects and other objects of the present invention, a computer readable storage medium that stores a set of software instructions which, when executed, effectuate processing COBOL language record description entries that specify data items that include a varying length characteristic is provided. The storage medium includes instructions for receiving COBOL language record description entries that specify data items that include a varying length characteristic and a plurality of subfields including a length subfield. The storage medium further includes instructions for processing the COBOL language record description entries to create at least one of a compiled specification and compiled data. The subfields are treated as a single composite field, and the length subfield is automatically set to the appropriate corresponding value during processing.

The storage medium may further include instructions for receiving replacement data specifications. A compiled replacement specification may be created based on the replacement data specification during processing.

The storage medium may further include instructions for receiving replacement data. Compiled replacement data may be created during processing based on the replacement data.

Both a compiled specification and compiled data may be created during processing.

At least one of the compiled specification and the compiled data may be used during replacement processing.

The data item may be any type allowed by COBOL and, in addition, may be a character or graphic data item that includes a varying length characteristic.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 3a-3f are block diagram flow charts illustrating original data replacement processing in accordance with another embodiment of the invention.

DETAILED DESCRIPTION OF THE PREFERRED EMBODIMENTS

One embodiment of this invention relates to the compilation and processing of COBOL language/record description entries that specify character and/or graphic data items that include a varying length characteristic.

Figure 1:
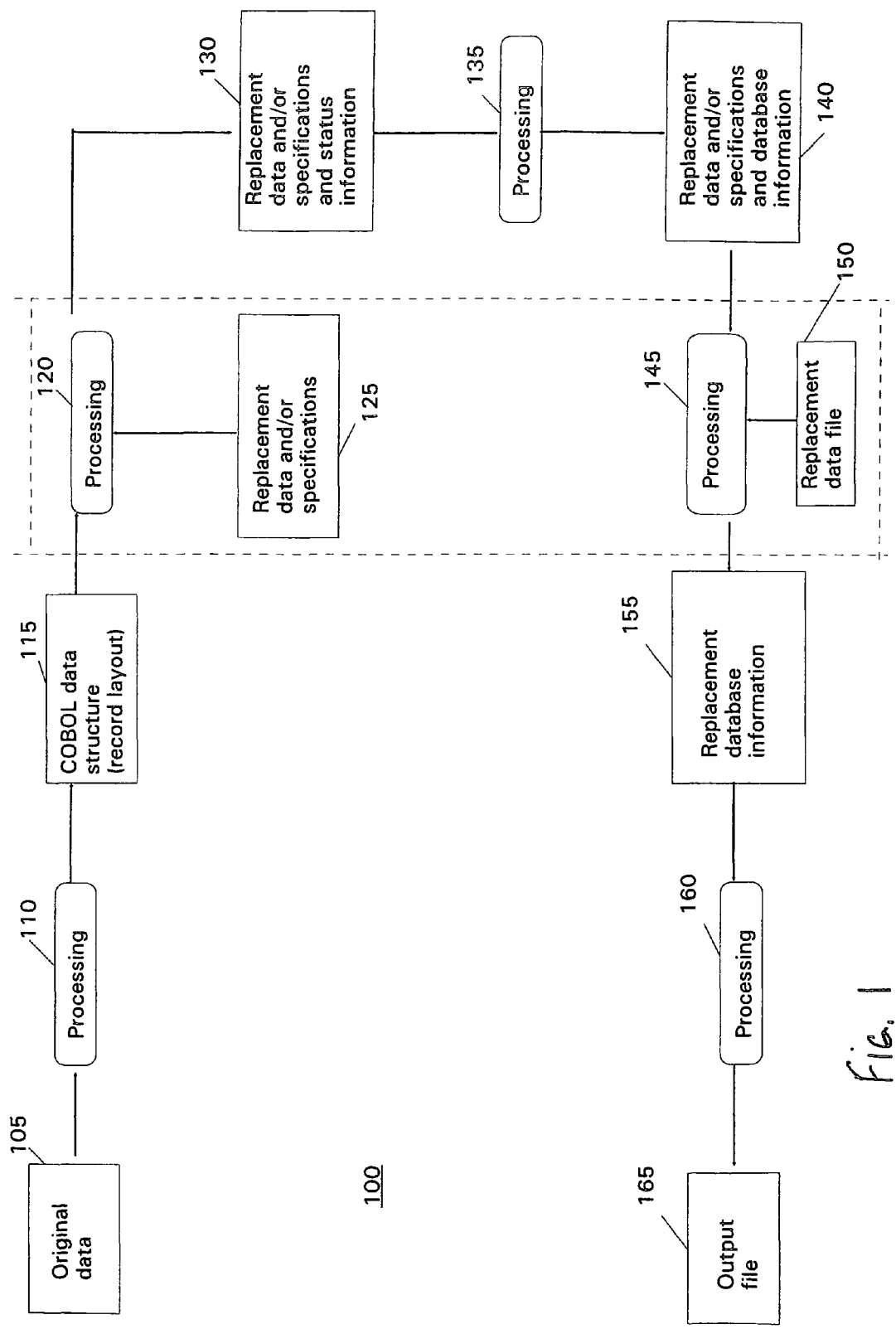
FIG. 1 is a block diagram flow chart of an example system for processing data in accordance with the present invention.

Referring now to the drawing figures, FIG. 1 shows a data processing system 100 that provides processing of COBOL language record description entries that specify data items that include a varying length characteristic. Original data 105 is retrieved from a data source such as a database or a data warehouse and go through processing 110 to convert the original data 105 into a COBOL data structure or a record layout 115 if such processing 110 is necessary to create a COBOL language record description entry that specifies data items that include a varying length characteristic.

In one embodiment of the present invention, the processing 110 may be performed to extract related subsets of data from the most recent full image copy. The processing 110 may create a subset of the information while maintaining the relationships between the data.

Then processing 120 occurs. Processing 120 may include the selection of fields, the specification of replacement information, and checks to see if the requested action is acceptable. The requested action may be provided by replacement data and/or specifications 125. The processing 120 creates replacement data and/or specifications and status information at block 130. The replacement specifications may be disguised specifications or other replacements such as corrections of spelling or a legal name change.

Processing 135 of the replacement data and/or specifications and status information occurs to create replacement data and/or specifications and database information 140.

Processing 145 of the replacement data and/or specifications and database information 140 occurs together with an optional replacement data file 150 to obtain replacement database information 155 if specified in the replacement specification.

Finally, processing 160 occurs on the replacement database information 155 to obtain an output file 165.

The processing blocks 120 and 145 may be provided by a data replacement processor such as an application entitled "File-AID/Data Solutions release 3.5.0," which generally provides sensitive data protection by encrypting or replacing individual fields with table or key driven routines. This application may replace values to conceal sensitive data, for example.

The remaining processing blocks 110, 135 and 160 may be provided by an application entitled "File-AID/RDX release 4.2.0," which generally may be utilized for extracting and processing related data for application test environments.

In general, one embodiment of the present invention allows for specifying VARYING and/or VAR for a varying length character and/or graphic data item in a COBOL record description entry. The embodiment treats the two (2) above-mentioned subfields defining a COBOL record description as one (1) composite field. When the character and/or graphic data value defined in a COBOL record description is replaced with one embodiment of the current invention, the length subfield is automatically set to the appropriate, corresponding value. The embodiment allows a varying length field value of a data item defined in a COBOL record description to be replaced by either another varying length data item or a fixed length data item.

Figures 2A, 2B:
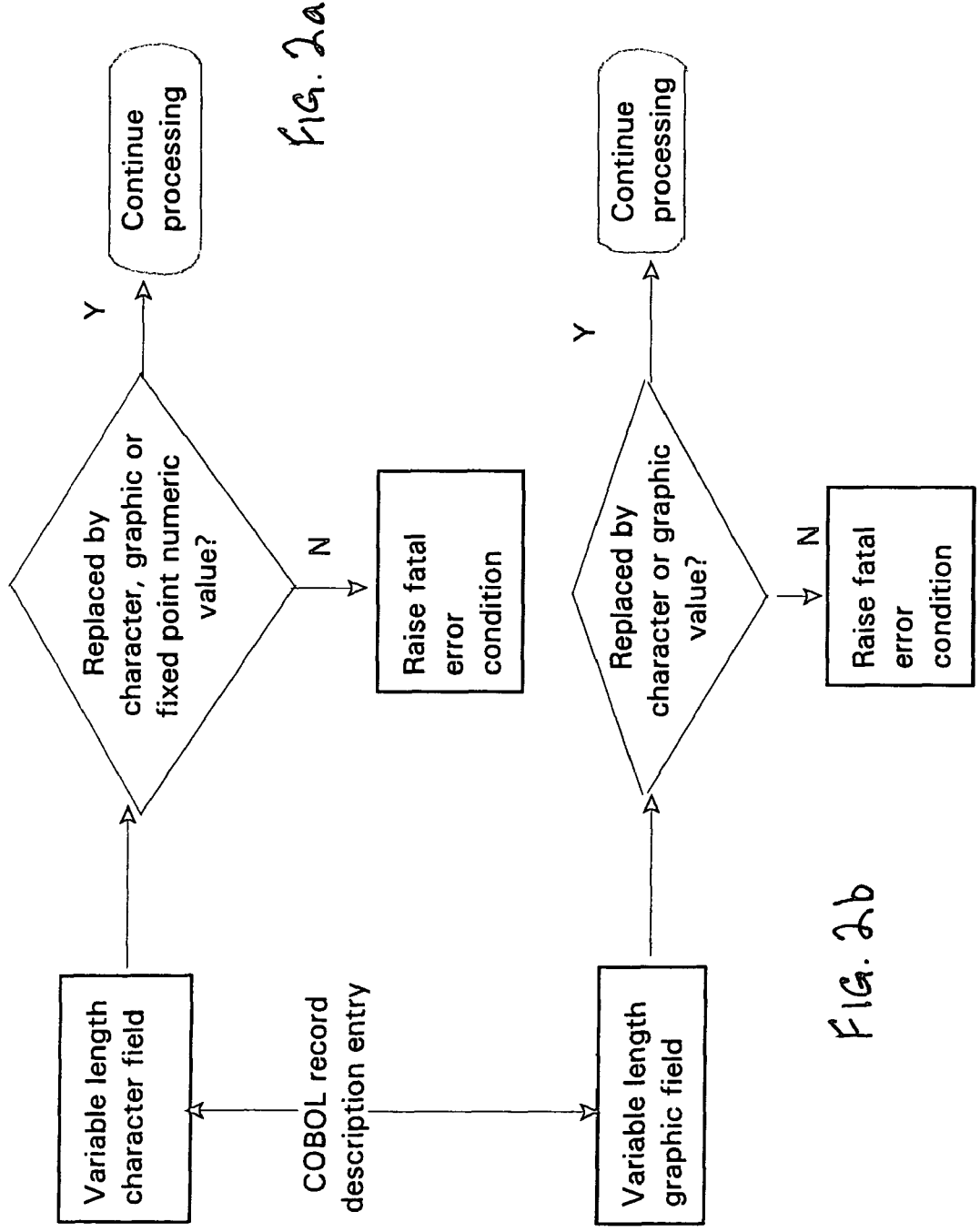
FIGS. 2a and 2b are block diagram flow charts illustrating specification compilation in accordance with one embodiment of the invention.

Referring now to FIG. 2a (and blocks 115, 120, 125 and 130 of FIG. 1), in a specification compilation phase of one embodiment of the invention, a variable length character field may only be replaced by a character, graphic, or fixed point numeric value. All other types of replacement values are disallowed and, if attempted, a fatal error condition is raised during specification compilation.

Referring now to FIG. 2b (and blocks 115, 120, 125 and 130 of FIG. 1), also in the specification compilation phase of the one embodiment, a variable length graphic field may only be replaced by a character or graphic value. All other types of replacement values are disallowed and, if attempted, a fatal error condition is raised during specification compilation.

Referring now to FIGS. 3a-3f (and blocks 140, 145, 150 and 155 of FIG. 1), in a replacement data compilation or processing phase of one embodiment of the invention, a number of exemplary variable length fields are replaced by corresponding values.

In FIG. 3a, when a variable length character and/or graphic field is replaced by a same length or shorter value, the unused, excess portion, if any, up to the specified maximum length is replaced by blanks and a successful condition code is set.

In general, and with respect to other replacement values noted herein below, trailing blanks, if any, in the replacement value are not included when determining the value of the length subfield. Also, a replacement consisting of all blanks will result in a length value of zero.

In FIG. 3b, when a variable length character field is replaced by a non-character numeric value of the same or shorter length, the numeric value is first converted to an unsigned character format without leading zeros and then character processing is performed.

In FIG. 3c, when a variable length character and/or graphic field is replaced by a longer character or graphic value, the value is truncated on the right and a successful condition is set.

Figures 3D, 3E, 3F:
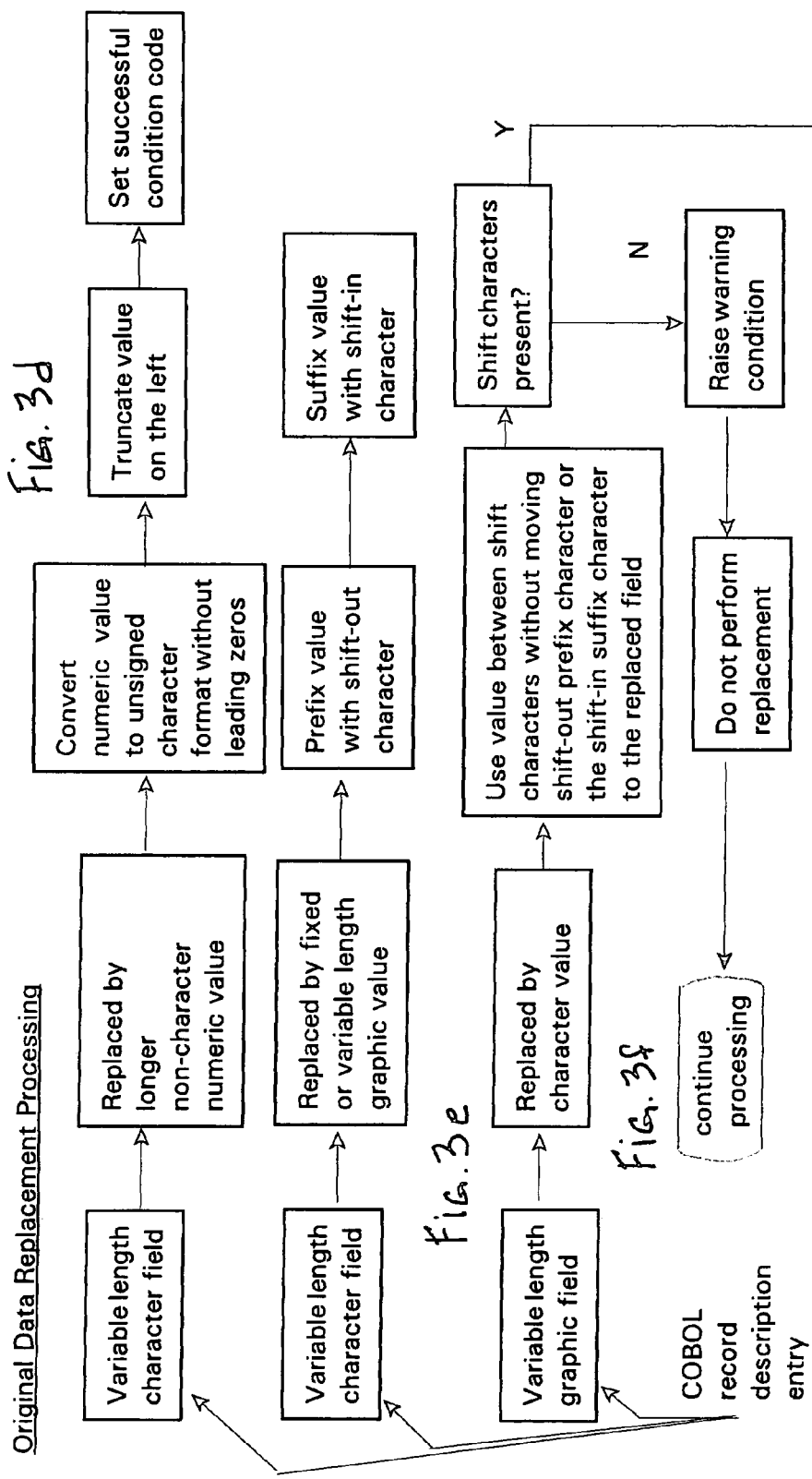

In FIG. 3d, when a variable length character field is replaced by a longer non-character numeric value, the numeric value is first converted to an unsigned character format without leading zeros and then the value is truncated on the left and a successful condition is set.

In FIG. 3e, when a variable length character field is replaced by a fixed or variable length graphic value, the value is prefixed with a shift-out character and suffixed by a shift-in character.

In FIG. 3f, when a variable length graphic field is replaced by a character value, the shift-out prefix character and shift-in suffix character are not moved to the replaced field. Only the value between the shift characters is used. If the shift characters are not present, a warning condition is raised and replacement does not take place but processing continues.

The advantages accruing to the use of the method, system and computer readable storage medium for storing instructions for performing one embodiment of the present invention are numerous. For example, application programmers who prefer to specify their record descriptions in COBOL will be able to define varying length character and/or graphic data items as one composite entry rather than two (2) separate entries in COBOL instead of resorting to another less preferred language. Also, COBOL application programmers will not have to maintain the two (2) subfields separately, themselves.

The above-described embodiment of the invention has particular utility in the following applications provided by the assignee of the present invention:

File-AID/Data Solutions release 3.5.0 and File-AID/RDX release 4.2.0 to process the varying attribute for character and/or graphic data items in a COBOL language record description entry.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for processing files containing fields which are defined by COBOL (i.e., COmmon Business Oriented Language) language record descriptions that contain elementary items that specify data items that include a varying length characteristic, the method comprising:

providing COBOL language record descriptions that contain elementary items that specify variable length elementary data items that include a varying length characteristic and a plurality of subfields including a data item length subfield; and compiling and processing the COBOL language record descriptions to create at least one of a compiled specification and compiled data wherein the subfields are treated as a single composite field and wherein the length subfield is automatically set to a varying value which represents the varying length of the variable length elementary data item during the step of processing the compiled record descriptions.

2. The method as claimed in claim 1, further comprising providing replacement data specifications wherein a compiled replacement specification is created based on the replacement data specification during the step of processing.

3. The method as claimed in claim 1, further comprising providing replacement data and wherein compiled replacement data is created during the step of processing based on the replacement data.

4. The method as claimed in claim 1, wherein both a compiled specification and compiled data are created during the step of processing.

5. The method as claimed in claim 4, wherein at least one of the compiled specification and the compiled data is used during replacement processing.

6. The method as claimed in claim 1, wherein the data item is a character data item.

7. The method as claimed in claim 1, wherein the data item is a graphic data item.

8. The method as claimed in claim 1, wherein the varying length characteristic is indicated by a VARYING clause or abbreviation VAR and wherein the value is based on a maximum field length minus a number of trailing blanks.

9. A data processing system for processing files containing fields which are defined by COBOL (i.e., COmmon Business Oriented Language) language record descriptions that contain elementary items that specify data items that include a varying length characteristic, the system comprising:
  means for providing COBOL language record descriptions that contain elementary items that specify variable length elementary data items that include a varying length characteristic and a plurality of subfields including a data item length subfield; and
  a processor for compiling and processing the COBOL language record descriptions to create at least one of a compiled specification and compiled data wherein the subfields are treated as a single composite field and wherein the length subfield is automatically set to a varying value which represents the varying length of the variable length elementary data item during processing the compiled record descriptions.

10. The system as claimed in claim 9, further comprising means for providing replacement data specifications wherein a compiled replacement specification is created based on the replacement data specification during processing.

11. The system as claimed in claim 9, further comprising means for providing replacement data and wherein compiled replacement data is created during processing based on the replacement data.

12. The system as claimed in claim 9, wherein both a compiled specification and compiled data are created during processing.

13. The system as claimed in claim 12, wherein at least one of the compiled specification and the compiled data is used during replacement processing.

14. The system as claimed in claim 9, wherein the data item is a character data item.

15. The system as claimed in claim 9, wherein the data item is a graphic data item.

16. The system as claimed in claim 9, wherein the varying length characteristic is indicated by a VARYING clause or abbreviation VAR and wherein the value is based on a maximum field length minus a number of trailing blanks.

17. A computer readable non-transitory storage medium that stores a set of software instructions which, when executed, effectuate processing files containing fields which are defined by COBOL (i.e., COmmon Business Oriented Language) language record descriptions that contain elementary items that specify data items that include a varying length characteristic, comprising instructions for:
  receiving COBOL language record descriptions that contain elementary items that specify variable length data items that include a varying length characteristic and a plurality of subfields including a data item length subfield; and
  compiling and processing the COBOL language record descriptions to create at least one of a compiled specification and compiled data wherein the subfields are treated as a single composite field and wherein the length subfield is automatically set to a varying value which represents the varying length of the variable length elementary data item during processing the compiled record descriptions.

18. The storage medium as claimed in claim 17, further comprising instructions for receiving replacement data specifications wherein a compiled replacement specification is created based on the replacement data specification during processing.

19. The storage medium as claimed in claim 17, further comprising instructions for receiving replacement data and wherein compiled replacement data is created during processing based on the replacement data.

20. The storage medium as claimed in claim 17, wherein both a compiled specification and compiled data are created during processing.

21. The storage medium as claimed in claim 20, wherein at least one of the compiled specification and the compiled data is used during replacement processing.

22. The storage medium as claimed in claim 17, wherein the data item is a character data item.

23. The storage medium as claimed in claim 17, wherein the data item is a graphic data item.

24. The storage medium as claimed in claim 17, wherein the varying length characteristic is indicated by a VARYING clause or abbreviation VAR and wherein the value is based on a maximum field length minus a number of trailing blanks.

* * * * *